Patented June 25, 1935

2,005,861

UNITED STATES PATENT OFFICE 2,005,861

MANUFACTURE OF HYDROCARBONS

Vladimir Ipatieff, Chicago, Ill., assignor to Universal Oil Products Company, Chicago, Ill., a corporation of Delaware No Drawing. Application January 16, 1933, Serial No. 652,009

5 Claims. (Cl. 260—168)

This invention relates more particularly to the manufacture of hydrocarbons of suitable boiling point for use as components of gasoline mixtures.

In a more specific sense the invention has reference to a process which both conserves materials which are ordinarily considered as waste products in cracking processes and at the same time produces hydrocarbons having specially high anti-detonating characteristics.

Owing to the adoption of high compression ratios in automobile engines to increase their thermodynamic efficiency, a demand has been made upon the petroleum refining and other industries which furnish hydrocarbon motor fuels, for fuels of a high antiknocking or slow-burning character. The cracking process which generally produces both unsaturated hydrocarbons and cyclic (including aromatic) hydrocarbons due to the dehydrogenating character of the decomposition reactions is employed quite generally to meet the demand for a high antiknock motor fuel. However, complete control of the proportion of aromatics to olefins is not always possible as the character of the charging oil varies with the type of crude oil from which they are produced, and when intensive cracking conditions are employed in an effort to increase the amount of aromatics and hence the antiknock value, undesirably large losses in gas and coke may be encountered and frequently the amount of olefins, particularly those of a highly unsaturated and unstable character, may increase roughly in proportion to the increase in aromatics.

The fixed gases produced in cracking processes contain notable amounts of olefins, including ethylene, propylene, the butylenes and other gases of a more highly unsaturated and still more reactive character such as acetylene, butadienes, etc. Extensive experimenting has been conducted to find ways of utilizing the reactive constituents of gases from cracking plants and convert them into more valuable products. For example, the process of manufacturing iso-propyl- and other alcohols from the olefins present in cracked gases has reached commercial proportions and the manufacture of glycol from ethylene is also practiced. The present process enables the effective utilization of the more reactive olefinic constituents of cracked gases and similar olefins produced in any manner.

In one specific embodiment the present invention comprises treatment of aromatic or similarly reactive cyclic hydrocarbons with olefinic gases in the presence of phosphoric acid catalyst.

I am aware that the "alkylation" of aromatic hydrocarbons by olefins in the presence of such catalytic condensing agents as sulfuric acid, aluminum chloride, etc., is known. When using these powerful reagents, however, there is a considerable tendency for the more reactive olefins such as di-olefins and certain iso olefins to undergo polymerization in preference to adding to the aromatic rings to produce alkyl derivatives. The extent of the polymerization reactions may be considerable and frequently involve the production of both materials boiling too high for use in gasoline and in addition polymers of such high molecular weight that they are of a gummy or resinous character. While the relative amounts of polymerization and alkylation may be controlled to a certain extent by conditions of operation, particularly in regard to temperature, such control is not always satisfactory and the present process is offered as a means of enabling better control of alkylation reactions and conservation of the more reactive and readily polymerizable materials.

The reactions between olefins and aromatics in the presence of condensing catalysts are basically of a simple character, although there is always a certain amount of side reactions resulting in loss of acid and oxidation of the hydrocarbons. Apparently the intermediate-compound theory of catalysis best explains reactions which means, in the present instance, that both types reacting components form transient addition compounds with the catalysts which further react to produce the synthetic hydrocarbon and regenerate the catalyst. The reaction which takes place when iso-butylene is reacted with benzol in the presence of phosphoric acid is in point and may be expressed by the following equation:

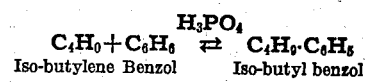

$$\underset{\text{Iso-butylene}}{C_4H_9} + \underset{\text{Benzol}}{C_6H_6} \underset{}{\overset{H_3PO_4}{\rightleftarrows}} \underset{\text{Iso-butyl benzol}}{C_4H_9 \cdot C_6H_5}$$

This equation shows the union of one molecule each of iso-butylene and benzol. The reactions may proceed further to the production of the di- and even tri-alkyl derivatives depending upon conditions of operation and the relative proportions of olefins and aromatics.

In conducting operations leading to the production of hydrocarbons according to the process of the present invention, olefins either individual or in admixture with other reactive olefins or paraffinic gases may be introduced into a well agitated mixture of liquid aromatic hydrocarbons and phosphoric acid. Moderately super-atmospheric temperatures are suitable such as those in the neighborhood of 60° C. in the case of the olefins present in such commercial gas mixtures as those encountered in oil cracking processes. It is preferred to use relatively concentrated phosphoric acid (85 to 100%) and a considerable quantity in relation to the volume of liquid aromatics since the acid undergoes less deterioration than sulfuric acid or other condensing agents which may be employed for similar purposes. When tests have shown that the desired degree of alkylation of the benzol has taken place, the gas stream may be stopped and the hydrocarbon layer separated from the acid.

The foregoing procedure is of a very simple character and in commercial practice may be modified to permit the use of ordinary batch and continuous treating plants which are familiar to petroleum refinery operators. For example, a mixture of phosphoric acid and aromatic oil may be circulated by centrifugal pumps taking suction at the bottom of a batch agitator and discharging back into the top. Such operation may be conducted to permit the separation and continuous removal of alkylated aromatics and if necessary the recycling of the gases.

As a further alternative method of operation, an olefinic gas mixture, for example, the fixed gases from an oil cracking plant, the requisite amount of aromatic oil and phosphoric acid may be injected into a suitable mixer positioned in the upper portion of a treating tower containing filling or spacing material, all reacting components passing downwardly through the interstices to effect substantially complete reaction. The gases denuded of reactive olefins may be separated in subsequent receivers and the acid and liquid hydrocarbon layers either returned to the treater or finally removed. As a general rule the acid may be cycled for a long time before it is contaminated to an extent rendering its use uneconomical.

The process may be operated in conjunction with the use of more powerful condensing reagents such as sulfuric acid or aluminum chloride which are employed in a second step to effect the addition of the residual olefins in the gas mixtures from the process to fresh quantities of aromatics or to the partially alkylated product of the process. Owing to the great variations in the composition of gases from cracking processes, it is evident that a variety of alkylated products is made possible and that the separate products may be held for blending with different gasolines which need different amounts of high antiknock blending materials to raise them up to any desired standard.

It is evident that on account of the large number of olefins on the one hand and aromatics on the other which may be reacted to form mixed hydrocarbon derivatives when using the catalyst comprised within the scope of the invention that a large number of cases might be cited showing the formation of compounds or mixtures of compounds of a widely varying character. It will be sufficient, however, to point out the results obtained when interacting two typical compounds representing the classes of hydrocarbons under discussion, to wit, iso-butylene and benzol. The iso-butylene employed was prepared from iso-butyl alcohol by the dehydrating action of sulfuric acid and showed by its physical characteristics that it was probably a mixture of both symmetrical and unsymmetrical alkyl substitution products of ethylene. The benzol was substantially the pure compound. The gaseous olefin mixture was passed into a thoroughly agitated mixture of benzol and 100% phosphoric acid in the ratio of approximately two volumes of benzol to one of acid, with the temperature maintained at about 60° C.

The following table shows the distillation range and the refractive index of the cuts obtained along with the ultimate analyses and specific gravity of two selected fractions:

TABLE #I
*Characteristics of alkylated products*

| % over | °C. | °F. | $N_D^{27}$ | S. G. at 20.8° C. | Ultimate analyses | |
|---|---|---|---|---|---|---|
| | | | | | C, % | H, % |
| 20 | 85 | 185 | 1.4804 | | | |
| 38 | 95 | 203 | 1.4769 | | | |
| 42 | 108 | 227 | 1.4335 | 0.7383 | 86 | 13.6 |
| 55 | 150 | 302 | 1.4204 | | | |
| 60 | 170 | 338 | 1.4559 | | | |
| 80 | 174 | 345 | 1.4617 | 0.8066 | 87.5 | 12.1 |
| 92 | 180 | 356 | 1.4602 | | | |
| 100 | 220 | 428 | 1.4615 | | | |

The following table, showing the physical constants of certain individual hydrocarbons which would normally be expected to be present in such a mixture as the above is given to permit intercomparison and identification of fractions.

TABLE #II
*Physical constants of pure components*

| | $N_D^{27}$ | Analyses | | $d_4^{20}$ |
|---|---|---|---|---|
| | | C, % | H, % | |
| Benzol | 1.4951 | 92.3 | 7.7 | 0.878 |
| Di-isobutylene | 1.4090 | 85.7 | 14.3 | 0.715 |
| Tri-isobutylene | 1.4305 | 85.7 | 14.3 | |
| Mono(t)butylbenzol | 1.4850 | 89.5 | 10.5 | 0.867 |
| Di(t)butylbenzol | | 88.5 | 11.6 | |

The following table is given to indicate that the fraction boiling between 170 and 174° C. closely approximates an equal mixture of mono-(t)butyl benzene and tri-iso-butylene:

TABLE #III
*Constants of 50/50 mixture of mono(t)butylbenzene and tri-isobutylene (170–174° C. fraction)*

| | Calc'd | Found in 170–174°C. fraction |
|---|---|---|
| Percent C | 87.6 | 87.5 |
| Percent H | 12.4 | 12.1 |
| $N_D^{27}$ | 1.458 | 1.462 |

In further substantiation of the alkylation reactions, a definite quantity of tertiary di-butyl benzol was isolated from the redistilled fraction. From the foregoing it is evident under the conditions used that alkylation and polymerization reactions proceeded with approximately equal velocity. The product shown in table #1 had an antiknock value greatly in excess of that of iso-octane and could be blended in any proportion with low antiknock value gasoline to improve its quality.

The foregoing specification has set forth the nature of the present invention and the numerical data given is sufficient to show its utility.

However, many other examples might be given and the invention is not to be unduly limited in its generally broad scope by the specific data presented.

I claim as my invention:

1. In the art of alkylation, the method which comprises reacting a hydrocarbon of the benzene series boiling within the gasoline range with a gaseous olefin in the presence of a phosphoric acid catalyst under conditions to produce a substantial quantity of alkylated derivatives within the gasoline boiling range, and recovering the gasoline boiling derivatives thus formed.

2. In the art of alkylation, the method which comprises treating an aromatic hydrocarbon of the benzene series boiling within the gasoline range in the presence of a phosphoric acid catalyst, with the olefinic gas mixture produced in the cracking of hydrocarbon oil, reacting olefins contained in the gas mixture with the aromatic hydrocarbon under conditions to produce a substantial quantity of alkylated derivatives within the gasoline boiling range, and recovering the gasoline boiling derivatives thus formed.

3. In the art of alkylation, the method which comprises treating an aromatic hydrocarbon of the benzene series boiling within the gasoline range in the presence of a phosphoric acid catalyst, with the olefinic gas mixture produced in the cracking of hydrocarbon oil, reacting olefins contained in the gas mixture with the aromatic hydrocarbon at a temperature not substantially above 60° C., to produce a substantial quantity of alkylated derivatives within the gasoline boiling range, and recovering the gasoline boiling derivatives thus formed.

4. A process for producing anti-knock compounds suitable as components of motor fuel, which comprises reacting a hydrocarbon of the benzene series boiling within the gasoline range with a gaseous olefin in the presence of a phosphoric acid catalyst at a temperature not substantially in excess of 60° C.

5. A process for producing anti-knock compounds suitable as components of motor fuel, which comprises reacting benzol with a gaseous olefin at a temperature not substantially above 60° and in the presence of a catalyst consisting essentially of phosphoric acid.

VLADIMIR IPATIEFF.